United States Patent [19]

Lee, Jr.

[11] Patent Number: 4,972,021

[45] Date of Patent: Nov. 20, 1990

[54] POLYPHENYLENE ETHER/POLYPROPYLENE COMPOSITIONS

[75] Inventor: Gim Fun Lee, Jr., Albany, N.Y.

[73] Assignee: General Electric Company, Selkirk, N.Y.

[21] Appl. No.: 244,489

[22] Filed: Sep. 14, 1988

[51] Int. Cl.$^5$ .............................................. C08L 71/12
[52] U.S. Cl. ...................................... 525/132; 525/92; 525/905
[58] Field of Search ............................. 525/132, 905

[56] References Cited

U.S. PATENT DOCUMENTS

| | | |
|---|---|---|
| 3,257,357 | 6/1966 | Stamatoff. |
| 3,257,358 | 6/1966 | Stamatoff. |
| 3,306,374 | 2/1967 | Hay. |
| 3,306,375 | 2/1967 | Hay. |
| 3,361,351 | 1/1968 | Gowan. |
| 4,166,055 | 3/1979 | Lee, Jr.. |
| 4,383,082 | 5/1983 | Lee, Jr.. |

*Primary Examiner*—Jacob Ziegler
*Attorney, Agent, or Firm*—Hedman, Gibson, Costigan & Hoare

[57] ABSTRACT

Polyphenylene ether resin/polypropylene resin compositions are disclosed which have improved heat deflection temperature and stiffness. The improvements result from the use of a polyphenylene ether resin having an intrinsic viscosity of below about 0.30 dl./gm. The compositions may further comprise an impact modifier.

28 Claims, No Drawings

POLYPHENYLENE ETHER/POLYPROPYLENE COMPOSITIONS

FIELD OF THE INVENTION

The present invention relates to novel resin compositions comprising polyphenylene ethers and polypropylene which may optionally be combined with copolymers derived from a conjugated alkene and a vinyl aromatic compound.

BACKGROUND OF THE INVENTION

The term "polyphenylene ether" resin is descriptive of a well-known group of polymers that may be made by a variety of catalytic and non-catalytic processes.

The polyphenylene ethers are known and described in numerous publications, including U.S. Pat. Nos. 3,306,874 and 3,306,875 (Hay); and U.S. Pat. Nos. 3,257,357 and 3,257,358 (Stamatoff). They are useful for many commercial applications requiring high temperature resistance and, because they are thermoplastic, they can be formed into films, fibers and molded articles. In spite of these desirable properties, parts molded from polyphenylene ethers are somewhat brittle and exhibit poor impact strength. In addition, the relatively high melt viscosities and softening points are considered disadvantages in many uses. Films and fibers can be formed from polyphenylene ethers on a commercial scale using solution techniques, but melt processing is commercially unattractive because of the high temperatures required to soften the polymer and the problems associated therewith, such as instability and discoloration. Such techniques also require specially designed process equipment to operate at elevated temperatures. Molded articles can be formed by melt processing techniques, but again, the high temperatures required are undesirable.

In addition, although the polyphenylene ether resins have outstanding hydrolytic stability, making them very useful in contact with aqueous media, e.g. in dishwasher and laundry equipment, they will soften or dissolve when placed in contact with many other, more aggressive, solvents, e.g., halogenated or aromatic hydrocarbons and gasoline, which limits their use in applications where exposure to such solvents does or may occur.

It is known in the art that the properties of the polyphenylene ethers can be materially altered by forming compositions with other polymers and many such polyphenylene ether molding compositions have been disclosed in the prior art.

Blends of polyphenylene ethers and polyolefins are of great interest because they can bring some of the chemical resistance of the polyolefins to the polyphenylene ethers. However, such blends very often suffer from limitations of their own, apart from the limitations of the individual resins, due to the relative incompatibility of the polyphenylene ether resin and the polyolefin resin, especially in those blends where one of the resins is present in an amount of more than about 10% by weight, based on 100% by weight of the two combined. In such instances, the beneficial property aspects which one resin could possibly confer on the other may not be fully realized.

For instance, in a commonly-assigned patent, U.S. Pat. No. 3,361,851 (Gowan), polyphenylene ethers are formed into compositions with polyolefins to improve impact strength and resistance to aggressive solvents. Gowan discloses that the polyolefin may comprise from 1-10% by weight of the total composition.

One serious limitation of such systems is a severe tendency to undergo delamination, due to the agglomeration of dispersed domains into larger particles, thereby causing deterioration of physical properties. Another limitation is brittleness of the composition. The prior art has sought to improve the properties of these blends. S-EB-S rubbers are commonly used to improve the compatibility of the polyphenylene ether and polyolefin resins and to increase morphological stability in the melt. These systems are relatively inefficient because they require high levels of rubber to give a substantial effect.

For instance, in U.S. Pat. No. 4,116,055 (Lee, Jr.), compositions comprising a polyphenylene ether, an elastomeric block copolymer of a vinyl aromatic compound and a conjugated diene, and a polyolefin, optionally containing a styrene homopolymer or random copolymer resin, having improved toughness over compositions containing either the block copolymer or the polyolefin resin alone are disclosed. The polyolefin resin plus block copolymer of the A-B-A type is present at about 5-30% by weight of the total composition. The center block B is a conjugated diene of higher molecular weight than the combined weight of terminal blocks A and A'.

In U.S. Pat. No. 4,383,082 (Lee, Jr.), it is disclosed that larger amounts of polyolefin resin can be successfully incorporated in a polyphenylene ether resin when certain elastomeric diblock copolymers of the A-B type comprising an alkenyl aromatic compound A and a conjugated diene B, or a radial teleblock copolymer of an alkenyl aromatic compound and a conjugated diene, are used.

It is therefore an object of the present invention to provide polyphenylene ether resin/polypropylene resin compositions which have improved physical property profiles over prior art compositions.

It has now been surprisingly discovered that if a polyphenylene ether resin having a very low intrinsic viscosity, as that term is described hereinafter, is utilized in polymeric resin compositions comprised of polyphenylene ether resin and polypropylene resin, the heat deflection temperature (HDT) and stiffness are improved significantly over similar compositions which utilize "conventional" higher intrinsic viscosity polyphenylene ether resins. In addition, minor amounts, i.e. less than about (20%) of an impact modifier such as a diblock or triblock copolymer comprised of an alkenyl aromatic resin and a conjugated diene, or such as a rubber-modified alkenyl aromatic resin, can be employed in the present compositions. Significantly, the improvements in heat deflection temperature and stiffness, relative to comparison compositions, are maintained in the impact modified compositions and, in some instances, are even more improved.

SUMMARY OF THE INVENTION

In accordance with the present invention, there are provided thermoplastic compositions comprised of:
 (a) polyphenylene ether resin; and
 (b) polypropylene resin; wherein the polyphenylene ether resin has an intrinsic viscosity of less than about 0.30 dl./gm. as measured in chloroform at a temperature of about 25° C. Preferably, the intrinsic viscosity is less than about 0.25 and especially preferably is less than about 0.20.

In other preferred embodiments, the amount of polypropylene in such compositions is at least about 50% by weight, based upon 100% by weight of (a) and (b) combined, and more preferably is at least about 70% by weight, same basis.

In additional preferred embodiments, the compositions as mentioned above may contain a minor amount, i.e. less than about 20, preferably less than about 10, more preferably less than about 5 and most preferably between about 1–5 parts by weight of an impact modifier. The impact modifier can be any of the known impact modifiers utilized in the art and preferably is a diblock or triblock copolymer of an alkenyl aromatic resin and a conjugated diene, commonly referred to as an A-B or A-B-A (or A') type copolymer, respectively.

Especially preferred are certain triblock copolymers in which the center block B is an ethylene-butylene block and is of higher molecular weight than the combined molecular weight of terminal blocks A and A (or A'). Preferably, the total molecular weight of such triblock copolymers is between about 20,000 and 200,000, especially preferably is between 30,000 and 120,000 and most preferably is between about 40,000 and 80,000. The center block B is preferably between about 10,000 and 140,000, more preferably between about 20,000 and 200,000 and most preferably between about 30,000 and 60,000.

DETAILED DESCRIPTION

The polyphenylene ether resins which comprise component (a) of the present invention are normally homo- or copolymers having units of the formula:

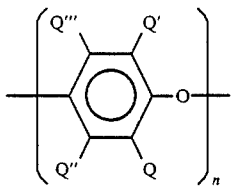

(I)

wherein Q, Q', Q" and Q''' are independently selected from the group consisting of hydrogen, halogen, hydrocarbon, halohydrocarbon, hydrocarbonoxy, and halohydrocarbonoxy; and n represents the total number of monomer units and is an integer of less than about 95, and more usually less than about 75, and preferably less than about 50. The polyphenylene ether resin can be prepared in accordance with known procedures, such as those described in the above-mentioned patents of Hay and Stamatoff, from the reaction of phenols including but not limited to: 2,6-dimethyl phenol; 2,6-diethylphenol; 2,6-dibutylphenol; 2,6-dilaurylphenol; 2,6-dipropylphenol; 2,6-diphenylphenol; 2-methyl-6-tolylphenol; 2-methyl-6methoxyphenol; 2,3,6-trimethylphenol; 2,3,5,6-tetramethylphenol, and 2,6-diethoxyphenol.

Each of these may be reacted alone to produce the corresponding homopolymer, or in pairs or with still other phenols to produce the corresponding copolymer. Examples of the homopolymer include:
poly (2,6-dimethyl-1,4-phenylene ether);
poly (2,6-diethyl-1,4-phenylene ether);
poly (2,6-dibutyl-1,4-phenylene ether);
poly (2,6-dilauryl-1,4-phenylene ether);
poly (2,6-dipropyl-1,4-phenylene ether);
poly (2,6-diphenyl-1,4-phenylene ether);
poly (2-methyl-6-tolyl-1,4-phenylene ether);
poly (2-methyl-6-butyl-1,4-phenylene ether);
poly (2,6-dimethoxy-1,4-phenylene ether);
poly (2,3,6-trimethyl-1,4-phenylene ether);
poly (2,3,5,6-tetramethyl-1,4-phenylene ether); and
poly (2,6-diethyoxy-1,4-phenylene ether).

Examples of the copolymers include those of 2,6-dimethylphenol with other phenols, such as poly(2,6-dimethyl-co-2,3,6-trimethyl-1, 4-phenylene ether) poly(2,6-dimethyl-co-2-methyl-6-butyl-1,4-phenylene ether); and the like.

For purposes of the present invention, an especially preferred family of polyphenylene ethers include those having alkyl substitution in the two positions ortho to the oxygen ether atom, i.e., those of the above formula wherein Q and Q' are alkyl, most preferably having from 1 to 4 carbon atoms. Illustrative members of this class are:
poly (2,6-dimethyl-1,4-phenylene) ether;
poly (2,6-diethyl-1,4-phenylene) ether;
poly (2-methyl-6-ethyl-1,4-phenylene) ether;
poly (2-methyl-6-propyl-1,4-phenylene) ether;
poly (2,6-dipropyl-1,4-phenylene) ether;
poly (2-ethyl-6-propyl-1,4-phenylene) ether; and the like.

The most preferred polyphenylene ether resin for purposes of the present invention is poly(2,6-dimethyl-1,4-phenylene) ether.

As mentioned, the polyphenylene ether resins suitable for use in the present invention, and which have been found to impart the unexpected and superior properties to the presently claimed compositions, are those which have an intrinsic viscosity below about 0.30 dl./gm., as measured in chloroform, at a temperature of about 25° C., preferably below about 0.25 and especially preferably below about 0.20.

Intrinsic viscosity is related to the molecular weight of the polyphenylene ether resin. Measurements of dilute solution viscosity provide the simplest and most widely used technique for routinely determining molecular weights. It is not an absolute method, and each polymer system must first be calibrated with absolute molecular weight determinations (usually by light scattering or other methods known in the art) run on fractionated polymer samples. Viscosities are usually measured at concentrations of about 0.5 gm. per 100 ml of solvent by determining the flow time of a certain volume of solution through a capillary of fixed length. They are run at constant temperature, usually about 25° C. Two typical viscometers are capillary viscometers commonly referred to as Ubbelohde and Cannon-Finske. Regardless of the type of viscometer, all viscometers operate on the same principle. That is, for any particular viscometer, there is a reservoir for holding a volume of the solution of which the viscosity is to be measured. The upper miniscus of the reservoir is allowed to reach a starting miniscus line and the time which it takes for the miniscus to reach a second miniscus line is dependent upon the viscosity of the solution. Each viscometer is calibrated for variations in the length and diameter of its capillary and this variation if factored into the viscosity calculations. The following are commonly referred to viscosity terms.

Relative viscosity (viscosity ratio), n rel:

$$n_{rel} = n/n_o = t/t_o$$

In this expression, n and no refer to solution and solvent viscosity, respectively, in poise units which are proportional to the corresponding flow times, t and $t_o$, through the viscometer capillary. Relative viscosity is dimensionless.

Specific viscosity, $n_{sp}$:

$$n_{sp} = \frac{n - n_o}{n_o} = \frac{t - t_o}{t_o} = n_{rel} - 1$$

Specific viscosity is also dimensionless.

Reduced viscosity (viscosity number), $n_{red}$:

$$n_{red} = n_{sp}/C$$

Inherent viscosity (logarithmic viscosity number), $n_{inh}$:

$$n_{inh} = \ln n_{rel}/C$$

Intrinsic viscosity (limiting viscosity number), [n]:

$$[n] = (n_{sp}/C)_{c=o} = (n_{inh})_{c=o}$$

Concentration, C, in the above expressions is in grams per 100 ml of solvent; therefore reduced, inherent, and intrinsic viscosities have units of deciliters per gram. Intrinsic viscosity is determined by extrapolating a plot of either reduced or inherent viscosity versus concentration to zero concentration. It is the most useful of the above expressions because it can be related to molecular weight according to the Mark-Houwink equation:

$$[n] = KM^a$$

where K and a are constants which depend on the nature of the polymer and the solvent. The terms a and log K represent the slope and intercept, respectively, of a plot of log [n] versus log of molecular weight of a series of fractionated polymer samples whose molecular weights have been determined by absolute methods. Such plots are linear when applied to unbranched polymers. To evaluate K and a, therefore, requires considerable manipulation, but fortunately these constants have been published for a wide variety of polymer types. The molecular weight obtained by the Mark-Houwink relationship is referred to as the viscosity average molecular weight, $M_v$. It is closer in value to the weight average molecular weight than to the number average molecular weight and therefore better results are obtained if the constants K and a are determined with fractionated samples of measured weight average molecular weights. As mentioned above, light scattering is commonly used.

As noted, intrinsic viscosity is directly related to molecular weight. Therefore, it is possible to obtain compositions according to the present invention simply by selecting polyphenylene ether resin by its molecular weight. In general, molecular weights of less than about 12,000 are suitable, preferably less than about 10,000 and more preferably less than about 6,000. Typically, "n" in formula I, above, will be less than about 95, preferably less than about 75, and more preferably less than about 50.

Component (b) may comprise a wide variety of polypropylenes. Polypropylene can polymerize to any of three different stereochemical arrangements which, by appropriate selection of production techniques and/or catalysts can be present alone or in different portions of a polypropylene polymer. Isotactic polypropylene has all of the methyl groups on one side of the extended polymer chain. Syndiotactic polypropylene has methyl groups alternating regularly from side to side along the extended polymer chain. Atactic polypropylene has methyl groups distributed from side to side of the extended polymer chain at random. By proper choice of experimental conditions, including catalyst, temperature and solvent, each of these stereopolymers can be made. Atactic polypropylene is a soft, elastic rubbery material. Both isotactic and syndiotactic polypropylenes are crystalline because the regularity of structure permits the chains to fit together well. Mixtures and combinations of polyphenylenes can be utilized. Crystalline polypropylene is preferred.

It is also possible to utilize branched polypropylene. Branched polypropylene may be made by a free-radical process and obtain a branched structure due to chain-transfer during polymerization in which the transfer agent is a polymer molecule in free radical form ($CH_2$—$CH_2$), and the branch is derived from having a hydrogen atom abstracted from somewhere along the polymer chain and a branching group at the point of attack. Branched polypropylene is essentially non-crystalline.

The optional diblock A-B copolymers of an alkenyl aromatic compound, A, and a conjugated diene, B, are derived from alkenyl aromatic compounds having the formula

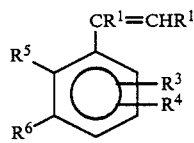

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with a hydrocarbyl group to form a napthyl group.

Specific examples of alkenyl aromatic monomers include styrene, bromostyrene, chlorostyrene, a-methylstyrene, para-methyl styrene, vinylxylene, divinylbenzene, vinyl naphthalene, and vinyl-toluene.

These are copolymerized with the conjugated diene, B, which is derived from, for example, 1,3-butadiene, 2-methyl1,3-butadiene and 1,3-pentadiene.

The A-B block copolymers can be made by following procedures which are well-known in the art or described in the patent literature, for example, in U.K. Patent No. 1,145,923. These polymers are also commercially available, e.g., from Shell Chemicals under the trade designation Shellvis 50. Preferably, these are diblock copolymers in which the aliphatic unsaturation, as in block B, has been reduced by hydrogenation. Such copolymers will preferably have the average unsaturation of rubber block B decreased to less than 20%, and more preferably less than 10% of its original value.

Hydrogenation can be used by carrying out a variety of hydrogenating catalysts, such as nickel or Kieselguhr, Raney nickel, copper, chromite, molybdenum sulfide, and finely divided platinum or other noble metals on a carrier.

Hydrogenation can be conducted at virtually any desired temperature or pressure, e.g., ranging from atmospheric to 3,000 psig and from 75° to 600° F., for up to 24 hours. Such procedures are well-known.

The term "radial teleblock copolymer" defines a well-known class of materials. These are commercially available or can be made by following procedures described in the patent literature, such as U.S. Pat. Nos. 3,595,942 and 4,090,996.

By way of illustration, a conjugated diene such as butadiene and a vinyl aromatic compound such as styrene are co-polymerized in the presence of an organo-metallic compound such as n-butyl lithium to produce a copolymeric product comprising chains terminating in an active metal atom, e.g., lithium. These copolymers are reacted with a coupling agent having more than one active site capable of reacting with and replacing the terminal metal atom on the polymer chains. The resulting copolymer is characterized by a structure comprised of a centrally located coupling agent from which extend in various directions several chains of the copolymer. If hydrogenation is desired, the copolymer can then be hydrogenated in the known manner, for example, by procedures described in De Vault, U.S. Pat. No. 3,696,088.

The A-B-A type block copolymers of a vinyl aromatic and a diene are well-known in the art and commercially available. These are described, for instance, in "Polymer Chemistry of Synthetic Elastomers", edited by Kennedy et al., Interscience Publishers, Vol. 23, Part II (1969), pages 553–559, the disclosure of which is incorporated herein by reference. Other descriptions are given in Zelinski, U.S. Pat. No. 3,251,905, and Holden et al., U.S. Pat. No. 3,321,635 which are also incorporated herein by reference.

In general, the optional block copolymer is of the A-B-A type in which terminal blocks A which can be the same or different, are thermoplastic homopolymers or copolymers prepared from a vinyl aromatic compound wherein the aromatic moiety can be either mono- or polycyclic. Examples include styrene, alpha-methyl styrene, vinyl toluene, vinyl xylene, ethyl vinyl xylene, vinyl napththalene and the like, or mixtures thereof.

Center Block B is an elastomeric polymer derived from a diene hydrocarbon preferably a conjugated diene, e.g., 1,3-butadiene, 2,3-dimethyl butadiene, isoprene, 1,3-pentadiene, and the like, or mixtures thereof. The ratio of the copolymers and the average molecular weights of each can vary broadly. Frequently, however, the molecular weight of center block B will be greater than that of the continued terminal blocks, which appear to be necessary for optimum impact strength and solvent resistance. The molecular weight of terminal block A will preferably range from about 2,000 to 100,000, while the molecular weight of center block B is preferably from about 25,000 to about 1,000,000.

If desired, the block copolymers can be post-treated to hydrogenate the rubber portion of the copolymer.

Hydrogenation can be carried out in a variety of hydrogenate catalysts, such as nickel or Kieselguhr, Runey nickel copper chromate, molybdenum sulfide and finely divided platinum or other nobel metals on a low surface area catalyst.

Hydrogenation can be produced at any desired temperature or pressure, e.g., from atmospheric to 3,000 psig, usually between 100 and 1,000 psig, and at temperatures between 75° to 600° F., for times ranging between 0.1 and 24 hours, preferably from 0.2 to 8 hours.

With respect to the hydrogenated A-B-A block copolymers, it is preferred to form terminal block A having average molecular weight of from about 4,000 to about 115,000 and center block B having an average molecular weight of from about 20,000 to about 450,000. Still more preferably, the terminal block A will have an average molecular weight of from 8,000 to 60,000 while center block B will have an average molecular weight of from about 50,000 to 300,000.

Especially preferred hydrogenated block copolymers are those having a polybutadiene center block wherein from 35 to 55%, more preferably from 40 to 50% of the butadiene carbon atoms are vinyl side chains.

The hydrogenated block copolymers are described further in Jones, U.S. Pat. No. 3,431,323 and De LaMare et al., U.S. Pat. No. 3,670,054, both of which are incorporated herein by reference.

In preferred compositions, the optional block copolymer will be an A-B-A block copolymer of the polystyrene-polybutadiene-polystyrene or polystyrene-polyisoprene-polystyrene type wherein the polybutadiene or polyisoprene portion can be either hydrogenated or non-hydrogenated.

The most preferred optional block copolymers of the present invention, comprise an alkenyl aromatic compound (A) and an ethylene-butylene center block (B) as mentioned previously, and are derived from compounds of the general formula:

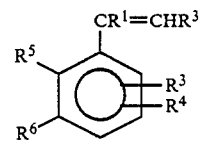

wherein $R^3$ and $R^4$ are selected from group consisting of chloro, bromo, hydrogen and lower alkyl of from 1 to 6 carbon atoms; $R^5$ and $R^6$ are selected from the group consisting of hydrogen, lower alkyl and lower alkenyl group of 1 to 6 carbon atoms or $R^5$ and $R^6$ may be concatenated together with hydrocarbyl groups to form a naphthyl group; said compounds being free of any substituent having a tertiary carbon atom. Preferred vinyl aromatic compounds are styrene, α-methyl styrene, vinyl toluene, vinyl xylene, vinyl naphthalene, and the like.

Preferred embodiments of the optional block copolymer provide styrene as the vinyl aromatic compound (A) and an ethylene-butylene block as the alkene (B). Most preferred are styrene-ethylene butylene-styrene (S-EB-S) triblock elastomers and styrene- ethylene-propylene (S-EP) diblock elastomers.

Furthermore, it has been found that favorable results are obtained when the ratio of (A) to (B) in the most preferred block copolymers is from about 26:74 to about 33:67 by weight. These preferred embodiments are available commercially in the various Kraton elastomers. Details on the structural composition of a number of Kratons are provided in Table 1.

TABLE 1

Block Copolymers

| Kraton | Type | S/XX ratio | molecular weight (in thousands) | | | |
|---|---|---|---|---|---|---|
| | | | PS | XX | PS | Total |
| D-1101 | S-B-S | 30/70 | 14.0 | 64 | 14 | 92 |
| D-1102 | S-B-S | 28/72 | 9.5 | 47 | 9.5 | 66 |
| G-1650 | S-EB-S | 28/72 | 10.0 | 54 | 10 | 74 |
| G-1651 | S-EB-S | 33/67 | 29.0 | 116 | 29 | 174 |
| G-1652 | S-EB-S | 29/71 | 7.5 | 37 | 7.5 | 52 |
| GX-1701 | S-EP | 36/64 | 39 | 70 | — | 109 |
| GX-1702 | S-EP | 26/74 | 43 | 121 | — | 164 |

Other ingredients can also be included in the compositions. These can be selected from among additives commonly employed with plastics, such as fillers and/or reinforcements, strengthening fibers, plasticizers, colorants, dyes, flame retardants, antioxidants, pigments, mold release agents, drip retardants and so forth for their conventionally employed purposes in conventional amounts. Minor but effective amounts are selected normally ranging from 1 to 60 parts by weight of the total composition weight.

In alternative embodiments, the composition include reinforcing fillers such as fibrous (filamentous) glass and/or graphite; mineral fillers such as mica, talc and the like, and preferably, clay; and polyethylene or other similar polymers as a carrier for the vinyl component. The filamentous glass suitable for use as reinforcement in such embodiments is well-known to those skilled in the art and is available from a number of manufacturers. The filaments are made by standard processes, e.g., by steam, air or flame blowing and, preferably, by mechanical pulling. The filaments preferably have diameters between about 0.00012" and 0.00075", but this is not critical to the present invention. The fillers can be untreated or treated with silane.

The length of the glass filaments and whether or not they are bundled into fibers and the fibers bundled in turn to yarns, ropes or rovings, or woven into mats and the like, are also not critical to the invention. However, in preparing the molding compositions, it is convenient to use the filamentous glass in the form of chopped strands about ⅛" to about 2" long. In articles molded from the compositions, on the other hand, fibers of shorter length may be present because, during compounding, considerable fragmentation occurs. This is desirable, however, because the best properties are exhibited by thermoplastic injection molded articles in which the filament lengths lie between about 0.0005" and 0.250".

The amount of the filler varies widely depending on the strength specifications which are to be met, it being essential only that an amount is employed which is at least sufficient to provide some reinforcement. Preferably, however, the weight of the reinforcing fibers is between about 1 percent and about 60 percent of the combined weight of filler and the resinous components of the mixture.

The compositions of the present invention, with and without fibrous reinforcement and filler, can be rendered flame retardant with an effective amount of a conventional flame retardant agent. As is well known, flame retardants can be based on elementary red phosphorus, phosphorus compounds, halogen and nitrogen compounds alone or, preferably, in further combination with synergists such as antimony compounds.

The compositions can be prepared using any of the known procedures. In one such procedure, a preblend on the ingredients is formed, extruded on a single or twin screw extruder at a temperature of between 400° and 550° F., chopped, cut or ground to smaller size and injection molded at temperatures of from 400° to 500° F. to the desired shape and size.

DESCRIPTION OF THE PREFERRED EMBODIMENTS

The following examples illustrate the invention. They are not to be construed to limit the claims in any manner whatsoever. The PPO resin utilized in the Examples had an intrinsic viscosity (IV) as indicated.

EXAMPLES 1-2 AND COMPARISON EXAMPLES A-E

The ingredients noted below were blended on a mixer and the resultant blend is extruded on a twin screw 30 mm Werner-Pfleiderer extruder at 500° F., and molded at an injection temperature of 490° F., into test bars. The test bars were evaluated for the physical properties, with the results shown in the Table.

For purposes of comparison, other compositions not in accordance with the invention were also prepared, molded and tested under the same conditions. These are also noted in the Table below.

TABLE 1

| | Example | | | | | | |
|---|---|---|---|---|---|---|---|
| | A* | B** | C** | 1 | D** | E** | 2 |
| Composition (pbw) | | | | | | | |
| Polypropylene*** | 100 | 75 | 75 | 75 | 75 | 75 | 75 |
| Polyphenylene ether: | | | | | | | |
| 0.41 i.v. | — | 25 | — | — | 25 | — | — |
| 0.32 i.v. | — | — | 25 | — | — | 25 | — |
| 0.18 i.v. | — | — | — | 25 | — | — | 25 |
| KG 1650 (impact modifier) | — | — | — | — | 2 | 2 | 2 |
| Physical Properties | | | | | | | |
| Heat Deflection Temp. (HDT)°F. @ 66 psi | 229 | 252 | 249 | 310 | 225 | 211 | 290 |
| Tensile Yield (psi × $10^3$) | 4.6 | 3.7 | 3.6 | 5.0 | 4.0 | 3.9 | 5.0 |
| Tensile Strength (psi × $10^3$) | 2.7 | 3.4 | 3.0 | 5.0 | 3.2 | 3.2 | 4.9 |
| Flexural Modulus (psi × $10^3$) | 199 | 226 | 221 | 230 | 172 | 173 | 207 |
| Flexural Strength | 6.0 | 5.9 | 6.0 | 7.4 | 5.4 | 5.3 | 6.7 |

TABLE 1-continued

| | Example | | | | | | |
|---|---|---|---|---|---|---|---|
| | A* | B** | C** | 1 | D** | E** | 2 |
| (psi × 10³) | | | | | | | |

*Control
**Comparison Examples
***Polypropylene utilized was HIMONT 6323, available from Himont.

As can be seen from the results in above TABLE 1, the compositions of the present invention exhibit very improved heat deflection temperatures and stiffness characteristics over the control (A) and comparisons (B-E). This is entirely unexpected insofar as intrinsic viscosity of the polyphenylene ether, when reduced from 0.41 to 0.32, yields compositions which show no such improvements and, in fact, show reduced physical properties in some instances.

Obviously, other modifications and variations of the present invention are possible in light of the above teachings. It is, therefore, to be understood that changes may be made in the particular embodiments of the invention described which are within the full intended scope of the appended claims.

All of the above-mentioned patents are incorporated herein by reference.

I claim:

1. A thermoplastic composition comprising:
   (a) polyphenylene ether resin; and
   (b) polypropylene resin; wherein the polyphenylene ether resin has an intrinsic viscosity of less than about 0.30 dl./gm.

2. The composition according to claim 1, wherein the polyphenylene ether resin has an intrinsic viscosity of less than about 0.20 dl./gm.

3. The composition according to claim 1, wherein the polyphenylene ether resin has an intrinsic viscosity of less than about 0.10 dl./gm.

4. The composition according to claim 1, wherein the polyphenylene ether is a homo- or copolymer having units of the formula:

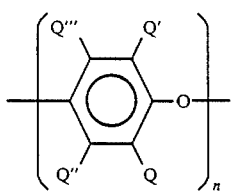

wherein Q, Q', Q" and Q''', are independently selected from the group consisting or hydrogen, halogen, hydrocarbon, halohydrocarbon, hydrocarbonoxy, and halohydrocarbonoxy; and n represents the total number of monomer units and is an integer of less than about 95.

5. The composition according to claim 4, wherein n is less than about 75.

6. The composition according to claim 4, wherein n is less than about 50.

7. The composition according to claim 4, wherein the polyphenylene ether has a number average molecular weight of less than 12,000.

8. The composition according to claim 1, wherein the polyphenylene ether is a homo- or copolymer produced from one or more polyphenylene ethers comprised of:
   poly(2,6-dipropyl-1,4-phenylene ether);
   poly(2,6-diphenyl-1,4-phenylene ether);
   poly(2-methyl-6-tolyl-1-4-phenylene ether);
   poly(2-methyl-6-butyl-1-4-phenylene ether);
   poly(2-6-dimethoxy-1-4-phenylene ether);
   poly(2,3,6-trimethyl-1,4-phenylene ether);
   poly(2,3,5,6-tetramethyl-1,4-phenylene ether);
   poly(2,6-diethyoxy-1,4-phenylene ether);
   poly(2,6-dimethyl-1,4-phenylene ether);
   poly(2,6-diethyl-1,4-phenylene ether);
   poly(2,6-dibutyl-1,4-phenylene ether); and
   poly(2,6-diauryl-1,4-phenylene ether).

9. The composition according to claim 8, wherein the copolymer is selected from poly(2,6-dimethyl-co-2,3,6-trimethyl-1 and poly(2,6-dimethyl-co-2-methyl-6-butyl-1, 4-phenylene ether).

10. The composition according to claim 1, wherein the polypropylene resin is crystalline.

11. The composition according to claim 10, wherein the polypropylene is isotactic or syndiotactic.

12. The composition according to claim 1, wherein component (b) is present in an amount of at least 50% by weight, based upon 100% by weight of (a) and (b) combined.

13. The composition according to claim 1, wherein component (b) is present in an amount of at least 70% by weight, based upon 100% by weight of (a) and (b) combined.

14. The composition according to claim 1, wherein component (b) is present in an amount of at least 90% by weight, based upon 100% by weight of (a) and (b) combined.

15. The composition according to claim 4, wherein the polyphenylene ether has a number average molecular weight of less than 10,000.

16. The composition according to claim 4, wherein the polyphenylene ether has a number average molecular weight of less than 6,000.

17. An article formed from the composition of claim 1.

18. A method of improving the heat deflection temperature and stiffness of a composition comprised of polyphenylene ether resin and polypropylene resin, said method comprised of utilizing polyphenylene ether resin having an intrinsic viscosity of below about 0.30.

19. A thermoplastic composition comprising:
   (a) polyphenylene ether resin; and
   (b) polypropylene resin; wherein the polyphenylene ether resin has an intrinsic viscosity of less than about 0.30 dl./gm., and wherein the polyphenylene ether resin is comprised of fewer than about 95 phenol monomer units.

20. The composition according to claim 19, wherein the number of phenol monomer units is less than about 75.

21. The composition according to claim 19, wherein the number of phenol monomer units is less than about 50.

22. The composition according to claim 19, wherein the polyphenylene ether has a number average molecular weight of less 12,000.

23. The composition according to claim 19, wherein the polyphenylene ether has a number average molecular weight of less than 10,000.

24. The composition according to claim 19, wherein the polyphenylene ether has a number average molecular weight of less than 6,000.

25. The composition according to claim 19, wherein the polyphenylene ether has a number average molecular weight of between 6,000 and 10,000.

26. The composition accordin to claim 19, wherein the polyphenylene ether resin has an intrinsic viscosity of less than about 0.20 dl./gm.

27. The composition according to claim 19, wherein the polyphenylene ether resin has an intrinsic viscosity of less than about 0.10 dl./gm.

28. The composition according to claim 19, wherein the polyphenylene ether resin has an intrinsic viscosity of between about 0.10 dl./gm. and 0.20 dl./gm.

* * * * *